3,161,672
PRODUCTION OF UNSATURATED MONOESTERS BY THE RHODIUM CATALYZED CARBONYLATION OF CONJUGATED DIOLEFINS
James Bryan Zachry, Baton Rouge, La., and Clyde Lee Aldridge, Bryan, Tex., assignors to Esso Research and Engineering Company, a corporation of Delaware
No Drawing. Filed Nov. 6, 1961, Ser. No. 150,184
6 Claims. (Cl. 260—486)

This invention relates to a process for producing oxygenated organic compounds from conjugated diolefins. More particularly, it relates to a process in which conjugated diolefins are catalytically reacted with carbon monoxide and a co-reactant containing hydrogen bonded to a noncarbon atom, e.g. an alcohol. Still more particularly, it relates to such carbonylation processes in which a catalyst comprising rhodium is employed.

It is known that conjugated diolefins may be reacted in the presence of cobalt catalysts with carbon monoxide and an alcohol or water to produce unsaturated esters and unsaturated acids, respectively. (See, for example, U.S. Patents 2,542,767 and 2,586,341.) Unless high pressures, e.g. above about 700 atmospheres, are employed, however, these reactions do not occur to any appreciable extent. Furthermore, even under optimum conditions, the yields of the desired unsaturated products are low.

It has now been surprisingly found that these and other reactions in which conjugated diolefins are converted to unsaturated oxygenated compounds by reaction with carbon monoxide and a co-reactant containing hydrogen bonded to a noncarbon atom are readily accomplished in the presence of a catalyst comprising rhodium, e.g. rhodium oxide. Thus, for example, unsaturated monoesters of carboxylic acids are produced by contacting a reaction mixture comprising a conjugated diolefin, carbon monoxide and an alcohol with rhodium oxide at moderately elevated temperatures and pressures. Not only are the desired unsaturated esters produced in good yield, but with the rhodium catalysts of the present invention, selectivities to unsaturated ester products are high and the reaction can be accomplished under relatively mild temperature and pressure conditions at which the cobalt catalysts of the prior art, as well as other Group VIII metal catalysts, are inoperative.

Various forms of rhodium are suitable in the present process. For example, either the metal per se or inorganic compounds thereof such as the oxide, halides, nitrate, sulfate and the like are satisfactory. Organic compounds of rhodium may also be used, e.g. rhodium carbonyl, rhodium salts of $C_1$ to $C_{20}$ carboxylic acids such as acetic, propionic, butanoic, hexanoic, maleic, linoleic, and stearic acids, or the salts of $C_1$ to $C_{20}$ alcohols. Of all these, however, rhodium oxide, e.g. the dioxide or the sesquioxide, is the preferred catalyst. Also, rhodium or its compounds may be employed in combination with any of the conventional catalyst carriers such as activated carbon, silica, alumina, silica-alumina, kieselguhr and the like. In such supported catalysts, the proportion of catalyst to carrier is not critical. However, for practical considerations, the rhodium content will comprise from about 1 to 40 wt. percent, based on carrier, with about 3 to 10 wt. percent being preferred.

The amount of catalyst employed in the process broadly comprises any amount sufficient to effectively catalyze the desired carbonylation reaction. Generally, from 0.001 to 5 wt. percent of catalyst, calculated as metal on diolefin feed is suitable, with amounts varying from 0.01 to 1 wt. percent being preferred.

A wide variety of conjugated diolefins can be used as feeds in the present process. Broadly, any conjugated diolefin which exists at least in part as a nonviscous liquid under the process conditions is suitable. Preferably, the diolefin feed comprises aliphatic and cycloaliphatic conjugated diolefins having from 4 to 20 carbon atoms. Because of their availability in commercial quantities, the lower aliphatic and cycloaliphatic conjugated diolefins, i.e. those having from 4 to 6 carbon atoms, are most preferred. For example, those conjugated diolefins which can be obtained in commercial quantity from petroleum refining processes, e.g. butadiene, isoprene, piperylene, and cyclopentadiene are presently the most suitable feeds; however, as the higher conjugated diolefins become available in larger than research amounts, it is contemplated that these also will become important for conversion to oxygenated compounds by the present process.

In accordance with the present invention, the conjugated diolefin is carbonylated in the presence of carbon monoxide and a co-reactant containing at least one hydrogen atom bonded to a noncarbon atom, e.g. an oxygen, nitrogen or sulfur atom. In general, it may be said that the co-reactants to be suitable in the present process are compounds composed only of the noncarbon atom and hydrogen, or compounds in which the noncarbon atom is bonded only to carbon in addition to being bonded to at least one hydrogen atom. Those compounds fulfilling the requirements of the co-reactant include alcohols, primary and secondary amines, mercaptans, water, ammonia, hydrogen sulfide, carboxylic acids, thiocarboxylic acids, amides, phenols and the like. The nature of the unsaturated oxygenated product will, of course, be dependent upon which of these type co-reactants is used, as well as on the conjugated diene. This is illustrated by the following equations in which butadiene is used as a typical conjugated diene feed:

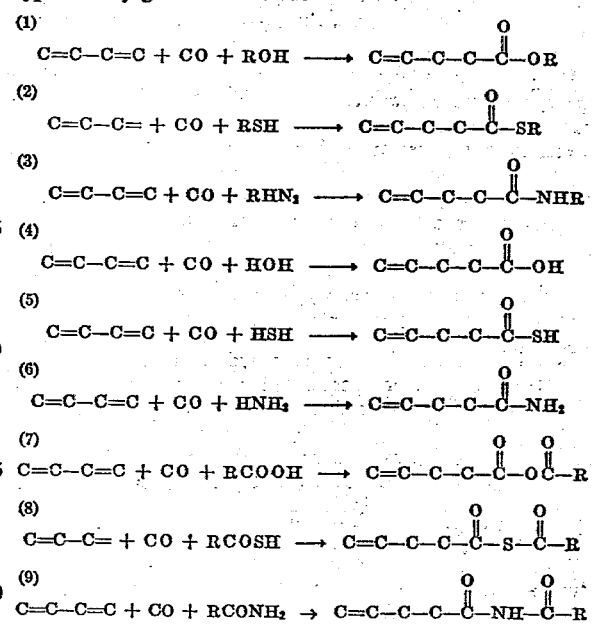

The R— groups of the alcohols, mercaptans, amines, acids and amides may be acyclic or cyclic aliphatic or aromatic groups of 1 to 20 carbon atoms. Generally, unsubstituted $C_1$ to $C_{20}$ alkyl, cycloalkyl, aryl, alkaryl or aralkyl R— groups are preferred. Of course, co-reactants containing more than one of the same or different functional groups in which hydrogen is bonded to oxygen, nitrogen or sulfur can be employed in the process. For example, co-reactants such as ethylene glycol, propylene glycol, trimethylolethane, trimethylolpropane, neopentyl glycol, ethylene diamine, trimethylene diamine, thioglycols, succinic acid, glutaric acid, monoethanolamine, diethanolamine, mercapto acids, monothioglycols, thiolamines, and the like may also be used.

Of the many compounds which may be employed as co-reactants in the present process, the $C_1$ to $C_{20}$ alkanols are preferred, e.g. methanol, ethanol, propanol, isopropanol, pentanols, hexanols, heptanols, lauryl alcohol, octadecyl alcohol, cyclopentanol, cyclohexanol, benzyl alcohol and the like and especially the lower alkanols, e.g., $C_1$ to $C_7$ alkanols.

Theoretically, the co-reactant and diolefin need be present in equivalent amounts. That is to say, to satisfy the stoichiometry of the reaction, at least one hydrogen atom bonded to oxygen, sulfur or nitrogen must be available in the co-reactant per mole of diene. It is preferable, however, that the coreactant be present in amounts stoichiometrically exceeding the amount of conjugated diolefin. While the excess over stoichiometric is not critical, it has been found that by having the second reactant present in quantities sufficient to serve both as a reactant and a diluent, e.g., preferably greater than 2 moles/mole of diolefin, the desired reaction proceeds more smoothly and less difficulties are experienced from side reactions such as polymerization. Alternatively, at least part of the diluent function of the co-reactant may be served by using other solvents which are inert under the process conditions, e.g. inert oxygenated solvents, hydrocarbons, and the like.

While not absolutely essential to the process, it has been found that trace amounts of certain substances serve as promoters, i.e. have a pronounced effect in promoting the desired reaction. Generally, the promoters comprise organic carboxylic acids and organic nitrogen bases or combinations thereof. More particularly, the promoters comprise compounds selected from the group consisting of the lower ($C_1$ to $C_7$) carboxylic acids, the lower alkyl amines, aromatic amines, and heterocyclic nitrogen bases, e.g. acetic acid, n-butylamine, aniline and pyridine. In those process systems in which water is not present inadvertently or otherwise, the addition of water thereto is also effective in promoting the desired reaction. The amount of promoter to be added in somewhat dependent upon the type compound employed as promoter as well as upon the nature of the other components of the reaction system; however, routine experimentation will readily establish the optimum amount of promoter in each case. In general, an amount of promoter approximately equivalent to the quantity of catalyst employed in suitable. Amounts exceeding this quantity may be used, but little additional advantage results therefrom.

In order to bring about the desired carbonylation reaction, it is necessary to provide superatmospheric pressures of carbon monoxide. Preferably, the carbon monoxide should be substantially free of hydrogen so as to avoid losses of diolefin or unsaturated product through hydrogenation and/or other side reactions. For example, the use of synthesis gas, e.g. 1/1 molar ratio of hydrogen to carbon monoxide as a source of carbon monoxide in the present process results in a variety of both saturated and unsaturated products including acetals, and consequently, is not to be preferred. However, carbon monoxide streams containing small amounts of hydrogen can be used and advantageously so in those instances in which the cost of removing hydrogen from the carbon monoxide exceeds economic losses due to hydrogenation and/or other side reactions. It is also desirable in order to obtain maximum catalyst efficiency to use a carbon monoxide stream from which catalyst poisons have been removed, e.g. iron carbonyl. The removal of such poisons is readily accomplished by passing the stream under pressure through a bed of solid adsorbent, e.g. molecular sieves, prior to use in the present process.

Stoichiometrically, one mole of carbon monoxide is required for each mole of diolefin processed. In practice, 50 to 150% and even higher excesses of carbon monoxide over the theoretical amount are provided. As to the carbon monoxide partial pressure, this is not critical so long as superatmospheric pressures are used. Carbon monoxide pressures of between 250 to 5000 p.s.i.g. have been found to be satisfactory. While lower pressures may be employed, the rate of reaction is adversely affected if the pressure is appreciably reduced. Higher pressures may also be utilized, but any advantage thus realized does not appear to be sufficient to offset the increased costs of ultra-high pressure equipment. The range of carbon monoxide partial pressure between 500 and 3000 p.s.i.g. has been found to be a preferred range from the viewpoint of adequate reaction rates as well as reasonable equipment costs.

The temperature of the reaction may also vary considerably, e.g., from 50° to 300° C. The reaction rate is observed to decrease significantly when lower temperatures are employed, while higher temperatures promote side reactions such as the polymerization of the conjugated diolefin feed. Temperatures between 125° and 225° C. are preferred, since in this range of temperatures, the rate of reaction is rapid and losses to side reactions are minimized.

The process of the present invention is generally carried out by heating the reaction mixture comprising the conjugated diolefin, the co-reactant, carbon monoxide, and when employed, the promoter, in a suitable pressure vessel and in contact with the rhodium-comprising catalyst. While the process can be performed in autoclaves constructed of iron-containing materials, iron carbonyl is detrimental to the reaction and it is therefore preferred to use pressure vessels constructed or lined with inert materials, e.g. silver. An improvement in the conversion of diolefin to unsaturated product is also obtained if the diolefin is introduced into the reaction vessel over a period of time rather than all at once. The process may be carried out in a continuous manner as well as in batch operation as may be desired.

The following examples will further serve to illustrate the present invention.

EXAMPLE 1

A 1-liter stirred autoclave was charged with 1.5 g. of rhodium oxide ($Rh_2O_3$), a trace of water, i.e. 0.3 g. (approximately molecularly equivalent to the amount of catalyst), and 400 mls. of reagent grade methanol. The autoclave was heated to 150° C. and pressurized to 900 p.s.i.g. with carbon monoxide which previously had been passed under pressure through a bed of molecular sieves. Then 67.5 g. of high purity grade butadiene was pumped into the reactor over a period of 2 hours. The reaction was allowed to continue for an additional 3 hours while maintaining a total pressure between 900 and 1050 p.s.i.g. by the addition of carbon monoxide as necessary. After the autoclave had cooled, the liquid product was removed and stripped of methanol to obtain 72.5 g. of higher boiling material. The principal products therein were separated and identified as shown in Table I:

Table I

| | G. |
|---|---|
| Butenes | 2.0 |
| Vinyl cyclohexene | 8.8 |
| $CH_2=CH-CH_2-CH_2-COOMe$ | 39.4 |
| $CH_3-CH=CH-CH_2-COOMe$ | 26.8 |
| $CH_3-CH_2-CH=CH-COOMe$ | 2.8 |
| Heavier products [1] | 3.5 |

[1] Principally methyl cinnamate and methyl hydrocinnamate.

Thus, the conversion of butadiene was 66% and selectivity to unsaturated ester products was 73%. Essentially all of the unreacted butadiene was recoverable.

EXAMPLE 2

The procedure of Example 1 was followed except that the reaction was carried out under anhydrous conditions, i.e. in the absence of water. While the products were essentially the same as those obtained in Example 1, the yield was markedly decreased.

EXAMPLE 3

Table II lists the results obtained by carrying out the reaction described in Example 1 at other temperatures and pressures. In each case the product comprised the same components given in Example 1, although the distribution of these components varied somewhat with changing conditions.

*Table II*

| Temp., °C. | Total Pressure, p.s.i.g. | Grams of Product |
|---|---|---|
| 125 | 1,100 | 18 |
| 175 | 900 | 69.2 |
| 150 | 1,900 | 63.1 |
| 150 | 3,000 | 51.3 |

EXAMPLE 4

A reaction was carried out as described in Example 1 except that 71 g. of isoprene was used instead of butadiene. A product was obtained which weighed 42.5 g. and comprised a mixture of methyl esters of unsaturated $C_6$ acids.

EXAMPLE 5

To a 1-liter autoclave containing 0.3 g. of rhodium oxide was charged 400 ml. of absolute ethyl alcohol and 0.3 g. of water. The autoclave was heated to 150° C., and the entire charge of 52.5 g. of butadiene then pressured into the autoclave with carbon monoxide which had not been purified over an adsorbent. An average pressure of 825 p.s.i.g. was maintained over the reaction period of 6 hours. The product obtained by stripping off excess alcohol weighed 8.5 g. and comprised a mixture of ethyl esters of unsaturated $C_5$ acids.

EXAMPLE 6

A reaction was carried out as described in Example 5 except isopropyl alcohol was used in place of ethyl alcohol and the pressure was 975 p.s.i.g. The product weighed 11.0 g. and comprised a mixture of isopropyl esters of unsaturated $C_5$ acids.

EXAMPLE 7

A reaction was carried out as described in Example 1 with the following exceptions: the alcohol charged was heptanol-1, butadiene charged over a period of 1 hour was 34 g., run time was 3 hours. The product weighed 42.5 g. and comprised a mixture of heptyl esters of unsaturated $C_5$ acids.

EXAMPLE 8

The activity of various forms of rhodium was investigated in the following experiments. In each instance, the catalyst, 0.3 g. of water and 400 ml. of methanol was placed into a 1-liter autoclave. The autoclave was heated to 150° C. and 34 g. of butadiene then pumped in over a period of 1 hour under carbon monoxide pressure. The reaction was continued for 3 hours at 1000–1100 p.s.i.g. and 150° C. The results are summarized in Table III.

*Table III*

| Catalyst | Amount, g. | Percent Conversion to Ester |
|---|---|---|
| Rhodium oxide | 0.5 | 40 |
| Rhodium nitrate | 0.5 | 11 |
| Rhodium carbonyl* | 0.5 | 10 |
| Rhodium Black (metal) | 0.5 | 4 |
| 5% Rhodium on 13X molecular sieves | 6.0 | 11 |

*Preformed by reacting rhodium sesquioxide with CO and $H_2$ (1/1 molar ratio) at 150° C. and 3500 p.s.i.g.

EXAMPLE 9

A solution of 2.8 g. of rhodium nitrate in 60 ml. of water was slurried with 19 g. of 40–80 micron carbon (Columbia 4SX). The resultant paste was dried and then heated under nitrogen in a tube furnace for about 3 hours at 770° to 850° C. Six grams of the supported rhodium catalyst obtained in this way was placed into the 1-liter autoclave with 0.3 g. of water and 400 ml. of methanol. The autoclave was heated to 150° C. and 54.5 g. of butadiene was injected therein with carbon monoxide to a pressure of 850 p.s.i.g. After a reaction time of 5.2 hours, unsaturated ester product amounting to 9.5 g. was recovered.

EXAMPLE 10

A 1-liter autoclave containing 0.5 g. of rhodium oxide was charged with 400 ml. of methanol and a promoter as indicated in Table IV. The autoclave was heated to 150° C. and 54 g. of butadiene was pressured in all at one time with carbon monoxide. The carbon monoxide was pretreated by passage through a bed of molecular sieves. An average pressure of about 900 p.s.i.g. was maintained over the reaction period of 5 hours. The unsaturated ester product was isolated by distilling off unconverted butadiene and methanol from the reactor effluent. Results for various promoters are shown in Table IV.

*Table IV*

| Run No. | Catalyst Promoter | Butadiene Conversion to Ester, Mole Percent |
|---|---|---|
| A | 0.6 g. water | 14 |
| B | 0.6 g. acetic acid+water | 23 |
| C | 0.84 g. aniline | 35 |
| D | 0.93 g. aniline+0.6 g. acetic acid | 35 |
| E | 0.80 g. pyridine | 32 |
| F | 0.73 g. n-butyl amine | 35 |

EXAMPLE 11

Runs were made similar to Example 10 except that a silver-lined autoclave was used. Water, 0.3 g., was used as the promoter. Results for use of carbon monoxide treated with a bed of molecular sieve and carbon monoxide not so treated are compared in Table V.

*Table V*

| Promoter | CO Pretreat* | Butadiene Conversion to Ester, Mole Percent |
|---|---|---|
| 0.6 g. acetic acid | No | 28 |
| Do | Yes | 32 |

*Passed under pressure through a mixture of 13X and 5A molecular sieve.

EXAMPLE 12

A reaction was carried out as described in Example 5 except that 4.5 g. of cobaltic oxide was used in place of rhodium oxide. No carbonyl-containing products were formed. The organic product boiling above methanol amounted to only 0.4 g., and unlike the unsaturated esters, was essentially insoluble in carbon tetrachloride. Further investigation of the product by infrared spectroscopy and gas chromatography failed to detect the presence of an ester.

Iron carbonyl and the oxides of ruthenium, palladium, osmium, iridium, and platinum were similarly found to be ineffective.

The unsaturated ester products derived as illustrated in the previous examples are readily converted in a subsequent step via the Oxo reaction to aldehydic esters containing one carbon atom more than the unsaturated ester feed. Conventional oxonation conditions, including temperatures varying from 75° to 200° C. and synthesis gas pressures between 500 and 5000 p.s.i.g. are suitable. Example 13 is illustrative of this conversion.

EXAMPLE 13

Typical unsaturated monoesters prepared by the procedure described in Example 1 were oxonated at a temperature of 120° C. and 1200 p.s.i.g. synthesis gas pressure (1/1 molar ratio of hydrogen to carbon monoxide) in the presence of preformed cobalt carbonyl catalyst. Other reaction conditions and results are given in Table VI.

*Table VI*

| Run No. | I | II | III |
|---|---|---|---|
| Feed | Me-4-Pentenoate | Me-3-Pentenoate | 50–50 Mixture of Me-4- and Me-3-Pentenoate. |
| Solvent | Diethyl Ether | Diethyl Ether | None. |
| Mole Percent Catalyst on Feed | 2 | 2 | 0.7. |
| Reaction Time, Min | 100 | 132 | 180. |
| Conversion, Percent | 98 | 75 | 85. |
| Selectivity, Percent: | | | |
| Me-adipaldate (Me-5-formyl valerate) | 73 | 70 | 69. |
| Branched $C_7$ Aldehydic Esters | 27 | 30 | 31. |

The aldehydic esters produced in this way can be converted by means well known in the art to other useful products, e.g. by hydrolysis and oxidation to the corresponding diacids or by hydrogenation to the corresponding hydroxy esters. Hence, the process of the present invention provides the means to a wealth of disubstituted products from conjugated diolefin feeds.

While the foregoing examples emphasize the application of the present process to the production of unsaturated esters, they are intended to be illustrative only. Modifications of these specific illustrations are contemplated as being within the spirit of the invention. That is to say, other co-reactants as hereinbefore disclosed can be substituted for the alcohols in the specific examples to obtain other useful unsaturated products, e.g. unsaturated mercaptoesters, unsaturated amides, unsaturated acids, unsaturated thioacids, and the like. It will be understood, therefore, that the true nature of the invention is to be limited solely by the scope of the appended claims.

What is claimed is:

1. A process for producing a mono-olefinically unsaturated monoester which comprises carbonylating a $C_4$–$C_{20}$ conjugated diolefin in a $C_1$–$C_{20}$ alkanol solvent, at least 2 moles of said alkanol being present per mole of said diolefin, with substantially hydrogen-free carbon monoxide in the presence of from 0.001 to 5 wt. percent, calculated as metal on diolefin, of a catalyst selected from the group consisting a rhodium oxide, rhodium nitrate, rhodium carbonyl and rhodium metal, said carbonylation being carried out at a temperature in the range of 125° to 225° C. and a pressure of between 500 and 3000 p.s.i.g., and recovering said unsaturated monoester.

2. A process according to claim 1 in which said catalyst is rhodium oxide.

3. A process according to claim 1 wherein said catalyst is rhodium carbonyl.

4. A process according to claim 1 wherein the carbonylation reaction is carried out in the additional presence of a small but effective amount of a promoter selected from the group consisting of water, n-butylamine, aniline, pyridine and acetic acid.

5. A process according to claim 4 wherein said conjugated diolefin is isoprene.

6. A process for producing a mono-olefinically unsaturated monoester which comprises contacting a reaction mixture comprising butadiene and a $C_1$–$C_7$ alkanol, at least 2 moles of said alkanol being present per mole of said butadiene, with from 0.001 to 5 wt. percent, calculated as metal on diolefin, of a rhodium oxide catalyst, and a promoter in an amount about equivalent to the amount of said catalyst selected from the group consisting of water, n-butylamine, aniline, pyridine and acetic acid, under a substantially hydrogen-free carbon monoxide partial pressure of 500 to 3000 p.s.i.g. and at a temperature between 125° and 225° C., and recovering said unsaturated monoester.

References Cited in the file of this patent

UNITED STATES PATENTS 3,040,090     Alderson et al.     June 9, 1962

OTHER REFERENCES

Adkins et al.: J. Am. Chem. Soc. 70, 383–386 (1948).